US008919582B1

(12) United States Patent
Kmetz, III et al.

(10) Patent No.: US 8,919,582 B1
(45) Date of Patent: Dec. 30, 2014

(54) MODULAR CHANGEOVER PARTS CART

(71) Applicant: Change Parts, Inc., Ludington, MI (US)

(72) Inventors: Andrew Ray Kmetz, III, Ludington, MI (US); Kristian Michael Hanson, Ludington, MI (US)

(73) Assignee: Change Parts, Inc., Ludington, MI (US)

( * ) Notice: Subject to any disclaimer, the term of this patent is extended or adjusted under 35 U.S.C. 154(b) by 0 days.

(21) Appl. No.: 14/065,065

(22) Filed: Oct. 28, 2013

Related U.S. Application Data

(60) Provisional application No. 61/718,799, filed on Oct. 26, 2012.

(51) Int. Cl.
*B62B 1/00* (2006.01)
*B62B 5/00* (2006.01)

(52) U.S. Cl.
CPC ........................................ *B62B 5/00* (2013.01)
USPC ........................................ 211/85.8; 280/79.3

(58) Field of Classification Search
CPC ............ B62B 3/04; B62B 3/10; B62B 3/102; B62B 3/104; B62B 3/108
USPC ........ 211/13.1, 27, 41.14, 41.15, 41.16, 85.8; 211/186, 188, 189, 193; 248/129; 280/79.2, 280/79.3
See application file for complete search history.

(56) References Cited

U.S. PATENT DOCUMENTS

| | | | | |
|---|---|---|---|---|
| 525,162 A | * | 8/1894 | Schwartz | 211/190 |
| D182,483 S | * | 4/1958 | Skinner | D34/21 |
| 6,170,672 B1 | * | 1/2001 | Boettcher | 211/13.1 |
| 6,270,094 B1 | * | 8/2001 | Campbell | 280/47.19 |
| 6,523,776 B1 | * | 2/2003 | Elder | 242/594.4 |
| D491,330 S | * | 6/2004 | Violo | D34/21 |
| 7,185,899 B2 | * | 3/2007 | Thiede et al. | 280/47.35 |
| 7,290,777 B2 | * | 11/2007 | Preston et al. | 280/79.3 |
| 8,025,161 B2 | * | 9/2011 | Chookang | 211/41.14 |
| 8,297,452 B2 | * | 10/2012 | Anscomb et al. | 211/189 |
| 8,534,470 B1 | * | 9/2013 | Lin et al. | 211/27 |
| 2003/0196980 A1 | * | 10/2003 | Ahn | 211/189 |
| 2005/0067360 A1 | * | 3/2005 | Darvial | 211/41.14 |
| 2006/0054576 A1 | * | 3/2006 | Durham | 211/85.7 |
| 2006/0091096 A1 | * | 5/2006 | Velez et al. | 211/194 |

(Continued)

FOREIGN PATENT DOCUMENTS

FR 2619696 A1 * 3/1989 ............... A47F 5/00

OTHER PUBLICATIONS www.changeparts.com (Sep. 6, 2011), website, Retrived Jan. 9, 2013 via Wayback Machine, from http://www.changeparts.com/.*

*Primary Examiner* — Joshua Rodden
(74) *Attorney, Agent, or Firm* — McGarry Bair PC

(57) ABSTRACT

Changeover parts are mountable on a modular changeover parts cart characterized by a cart frame having a plurality of rigidly interconnected beams supportable on wheels, and a suspension frame having a plurality of rigidly interconnected vertical struts and beams supportable on the cart frame. A first one of a plurality of mounting components is removably coupleable with the cart frame or the suspension frame for supporting one of a star wheel, a guide, or a timing screw. The first one of the plurality of mounting components is simultaneously orthogonally coupleable with the plurality of beams. The first one of the plurality of mounting components is replaceable by or combinable with a second one of the plurality of mounting components for supporting another of a star wheel, a guide, or a timing screw.

16 Claims, 15 Drawing Sheets

(56) References Cited

U.S. PATENT DOCUMENTS

| | | | |
|---|---|---|---|
| 2009/0078665 A1* | 3/2009 | Sandusky et al. | 211/208 |
| 2011/0180501 A1* | 7/2011 | Lin et al. | 211/85.8 |
| 2013/0194662 A1* | 8/2013 | Kepley, Jr. | 359/443 |
| 2013/0233811 A1* | 9/2013 | Glover et al. | 211/41.14 |
| 2013/0240461 A1* | 9/2013 | Brevda et al. | 211/13.1 |
| 2013/0248473 A1* | 9/2013 | Liu et al. | 211/85.8 |

\* cited by examiner

MODULAR CHANGEOVER PARTS CART

CROSS-REFERENCE TO RELATED APPLICATION

This application claims the benefit of U.S. provisional application Ser. No. 61/718,799, filed Oct. 26, 2012, which is incorporated by reference herein in its entirety.

BACKGROUND

In one aspect, the invention relates to devices for storing changeover parts. In another aspect, the invention relates to a mobile frame for supporting hanger assemblies on which changeover parts may be carried.

Changeover parts may be utilized in industrial operations, such as packaging, that may entail a repeating sequence of steps, such as delivering a container to a station, filling the container at the station with a product, obtaining a closure from a source, positioning the closure over the filled container, affixing the closure to the filled container, and moving the closed container from the station. Boosting productivity may be an important objective, and may be dependent upon such factors as timing, positioning, sequencing of steps, coordination of steps, and the like. Changeover parts may provide process control facilitating high productivity.

Packaging changeover parts may comprise star wheels, guides, and timing screws. Star wheels may be rigid, rotatable circular plates comprising regularly-spaced circumferential arcuate recesses. Star wheels may comprise a single plate, or a pair of identical parallel plates coupled together by orthogonally-disposed cylindrical spacers to form a star wheel assembly wherein the recesses of both plates are co-aligned.

Guides may be rigid stationary plates comprising arcuate edges complementary with the circumference of a mating star wheel. The arcuate edges may define a continuous curve along which a container held in a star wheel recess may travel as the star wheel rotates adjacent the guide. Each guide may comprise two bilaterally symmetrical outwardly directed continuous curves defining a stylized somewhat X-shaped guide, each curve associated with a star wheel. As with star wheels, guides may comprise a single plate or a pair of parallel plates coupled together by orthogonally-disposed cylindrical spacers to form a guide assembly wherein the continuous curves of both plates are co-aligned.

Timing screws may be somewhat cylindrical screw-shaped members that may control the timing and type of container movement required for a selected run.

In the above example, the same operational steps may be employed for containers having different sizes, shapes, closures, etc. Different changeover parts may be needed to accommodate these different containers and different operational steps. Therefore, removal of one set of changeover parts, and replacement with another set of changeover parts, may be required. This process may be time consuming, particularly if not all required changeover parts may be readily accessible.

BRIEF DESCRIPTION OF THE INVENTION

Changeover parts are mountable on a modular changeover parts cart characterized by a cart frame having a plurality of rigidly interconnected beams supportable on wheels, and a suspension frame having a plurality of rigidly interconnected vertical struts and beams supportable on the cart frame. A first one of a plurality of mounting components is removably coupleable with the cart frame or the suspension frame for supporting one of a star wheel, a guide, or a timing screw. The first one of a plurality of mounting components is simultaneously orthogonally coupleable with a plurality of beams. The first one of a plurality of mounting components is replaceable by or combinable with a second one of a plurality of mounting components for supporting another of a star wheel, a guide, or a timing screw.

DESCRIPTION OF AN EMBODIMENT OF THE INVENTION

A modular changeover parts cart is described herein comprising an assembly of interconnected beams and vertical struts supported upon wheels. As used herein, a "beam" may be a generally horizontally disposed load-bearing member. A "vertical strut" may be a generally vertically disposed load-bearing member orthogonally supporting a plurality of beams rigidly coupled therewith. Beams may be generally parallel to a surface upon which the modular changeover parts cart may sit, and vertical struts may be generally perpendicular to a surface upon which the modular changeover parts cart may sit.

Figure 1:
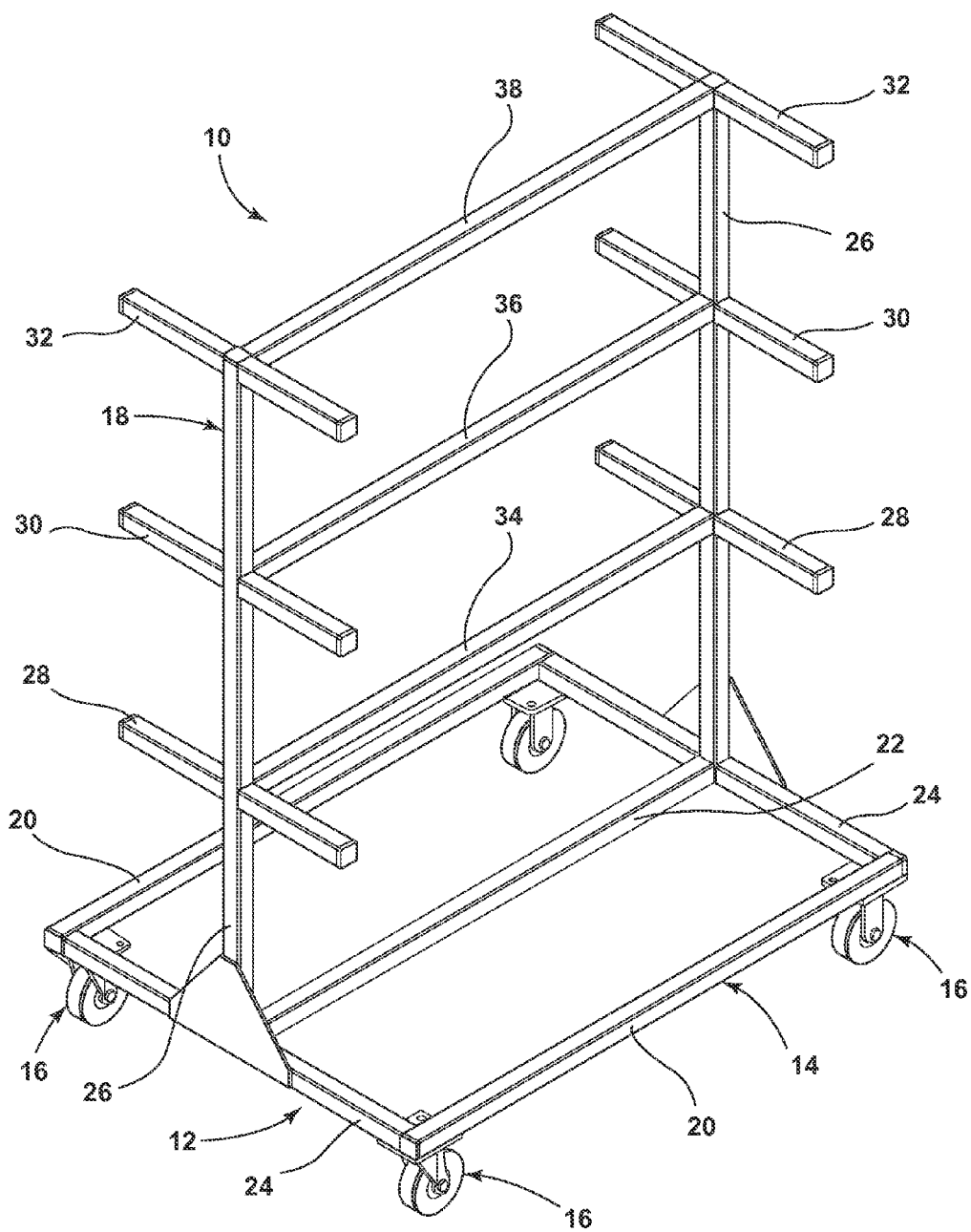
FIG. 1 is a perspective view of an exemplary embodiment of a modular changeover parts cart comprising a cart frame and a suspension frame for suspending changeover parts and related components.

Referring to the figures, and particularly to FIG. 1, a modular changeover parts cart 10 is shown comprising a cart 12 having a cart frame 14 supported on ground engaging wheels 16 according to an exemplary embodiment of the invention. A suspension frame 18 may be supported by and extend orthogonally away from the cart frame 14. A single suspension frame 18 may extend orthogonally away from the middle of the cart frame 14. However, it may be understood that the modular changeover parts cart may include a plurality of suspension frames extending from any selected portion of the cart frame 14.

The cart frame 14 may be a generally rectangular structure having a pair of parallel spaced side beams 20 and a center beam 22 parallel to the side beams 20. The side beams 20 and center beam 22 may be rigidly attached to a pair of parallel spaced end beams 24 to form a rigid cart frame 14.

The suspension frame 18 may be a generally rectangular structure having a pair of parallel spaced vertical struts 26 rigidly coupled with and extending orthogonally away from the cart frame 14. The two vertical struts 26 may be rigidly coupled with a frame lower beam 34, a frame middle beam 36, and a frame upper beam 38, extending orthogonally between the vertical struts 26 in parallel spaced disposition. A pair of coaxially disposed lower lateral cantilevered beams 28, coaxially disposed middle lateral cantilevered beams 30, and coaxially disposed upper lateral cantilevered beams 32, may extend orthogonally away from each vertical strut 26 parallel to the end beams 24. The lateral cantilevered beams 28, 30, 32 may be rigidly coupled with a vertical strut 26.

Figure 2:
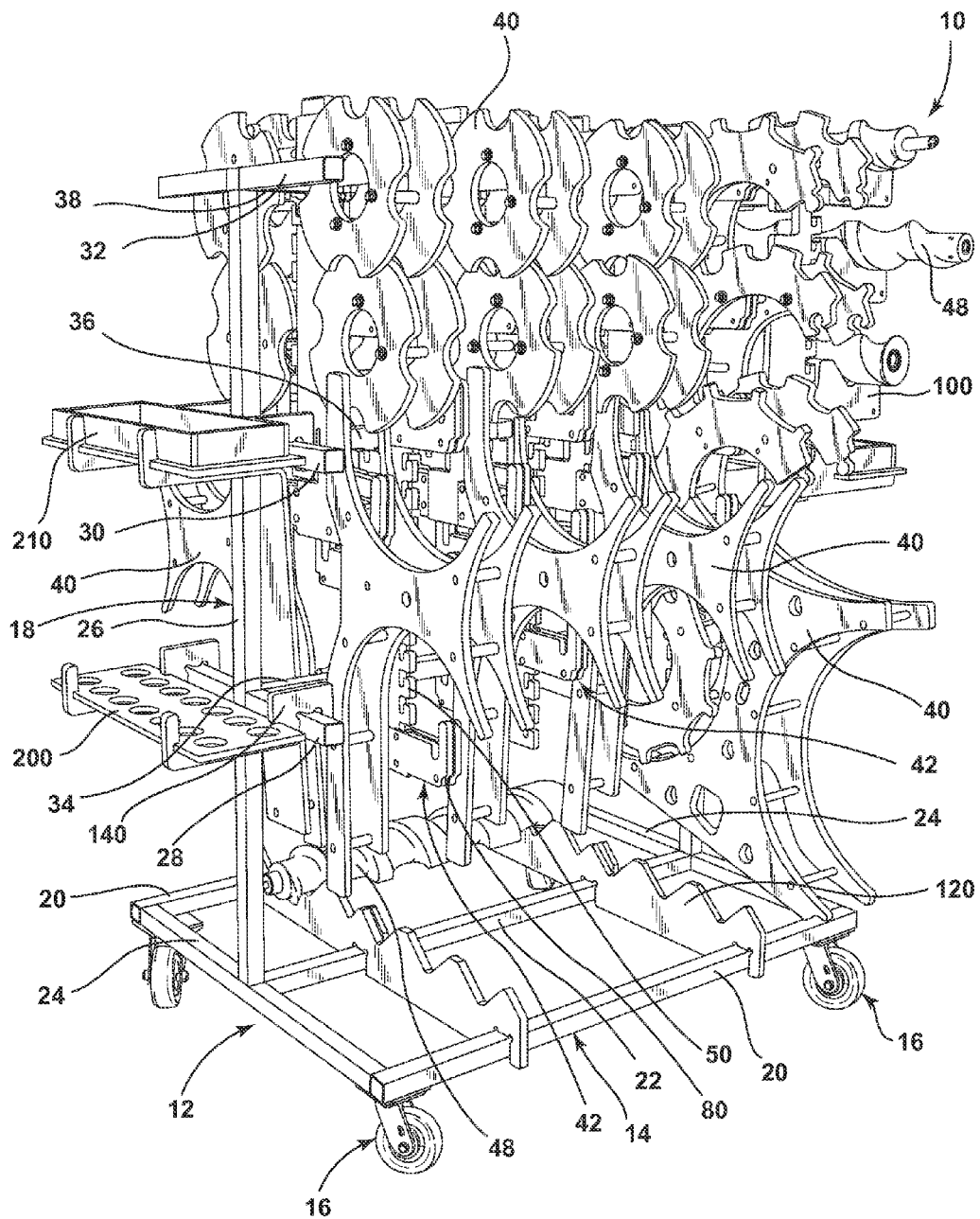
FIG. 2 is a first perspective view of an exemplary embodiment of a modular changeover parts cart according to the invention comprising changeover parts and related components suspended from a cart frame and a suspension frame.
Figure 3:
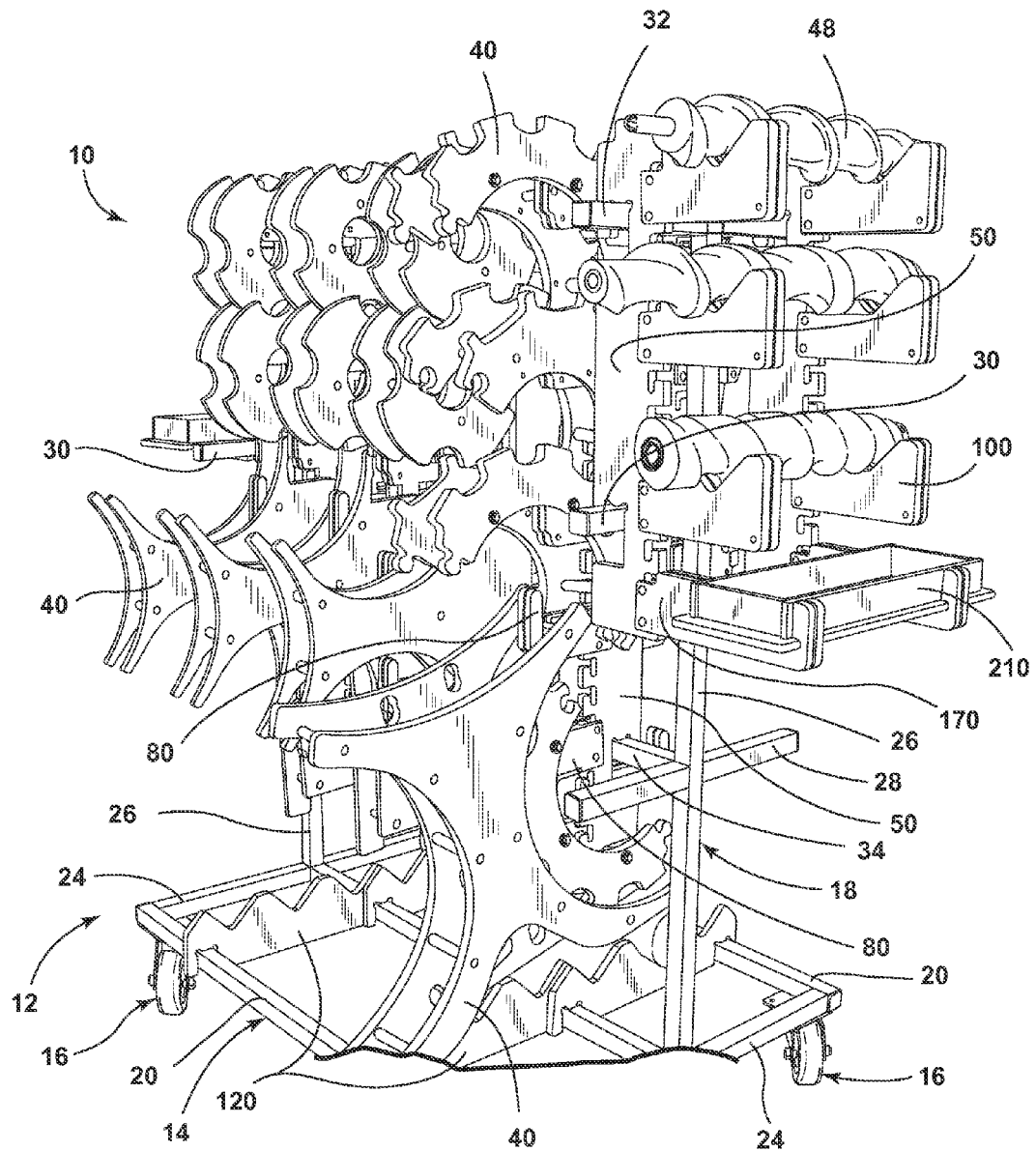
FIG. 3 is a second perspective view of the exemplary embodiment of a modular changeover parts cart illustrated in FIG. 2.

Referring also to FIGS. 2 and 3, the modular changeover parts cart 10 may support a plurality of changeover parts 40 having different configurations, suspended from assemblies of mounting components 42. The mounting components 42 may be interconnectable to enable different changeover parts 40 to be suspended. For example, as illustrated in FIG. 2, an assembly of mounting components 42 may comprise a pair of upright supports 50 supporting a plurality of timing screw support assemblies 100, each pair of support assemblies 100 supporting a plurality of generally known timing screws 48. FIGS. 2-15 illustrate a plurality of mounting components that may singly or collectively support a changeover part on the modular changeover parts cart 10. Consequently, "mounting components" may be understood to include both single component and multiple component assemblies.

Figure 4:
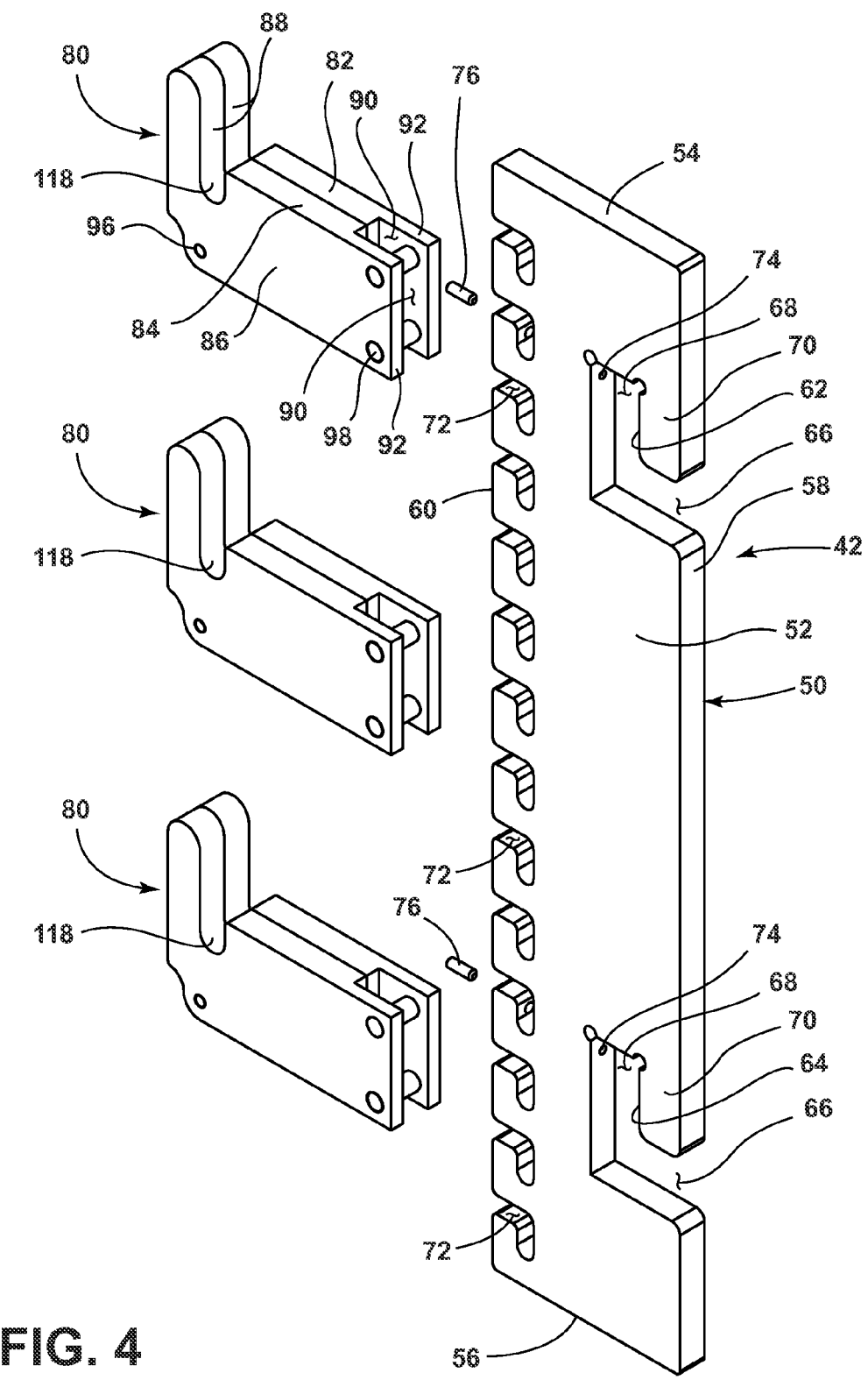
FIG. 4 is an exploded view of a mounting component comprising an upright support for attachment to the modular changeover parts cart and a hook assembly for suspension from the upright support.

Turning to FIG. 4, an alternative exemplary mounting component 42 may comprise an upright support 50 and at least one hook assembly 80. The upright support 50 may be an elongated, generally rectangular plate-like element having a midsection 52 terminating in an upper end 54 and a lower end 56 in parallel spaced disposition. Extending between the ends 54, 56 may be a first side edge 58 and a second side edge 60 in parallel spaced disposition. A first beam opening 62 and a second beam opening 64 may extend inwardly from the first side edge 58 in complementary spaced disposition. The beam openings 62, 64 may be configured to enable suspension of the upright supports 50 from a pair of vertically-spaced frame beams 34, 36, 38, such as the frame lower beam 34 and the frame middle beam 36, or the frame middle beam 36 and the frame upper beam 38. The beam openings 62, 64 may be configured with generally parallel walls to accommodate the generally rectangular beams. However, if the beams may be, for example, cylindrical tubes or rods, the beam openings 62, 64 may be configured with appropriately-sized curved surfaces.

The beam openings 62, 64 may be each defined by a channelway 66 extending toward the center of the upright support 50 from the first side edge 58. The channelway 66 may terminate in an orthogonally disposed beam receptacle 68 for receipt of a beam therein. The first and second beam openings 62, 64 may define a pair of tongues 70 for preventing the lateral movement of the upright support 50 away from a beam.

The second side edge 60 may be characterized by a linear array of L-shaped hanger openings 72. A pair of lock screw openings 74 may extend orthogonally through the second side edge 60 to terminate at the beam receptacle 68. The lock screw aperture 74 may be adapted for receipt of a lock screw 76 which may be tightened against the side of a beam to lock the upright support 50 in a selected location along a pair of beams.

Figure 5:
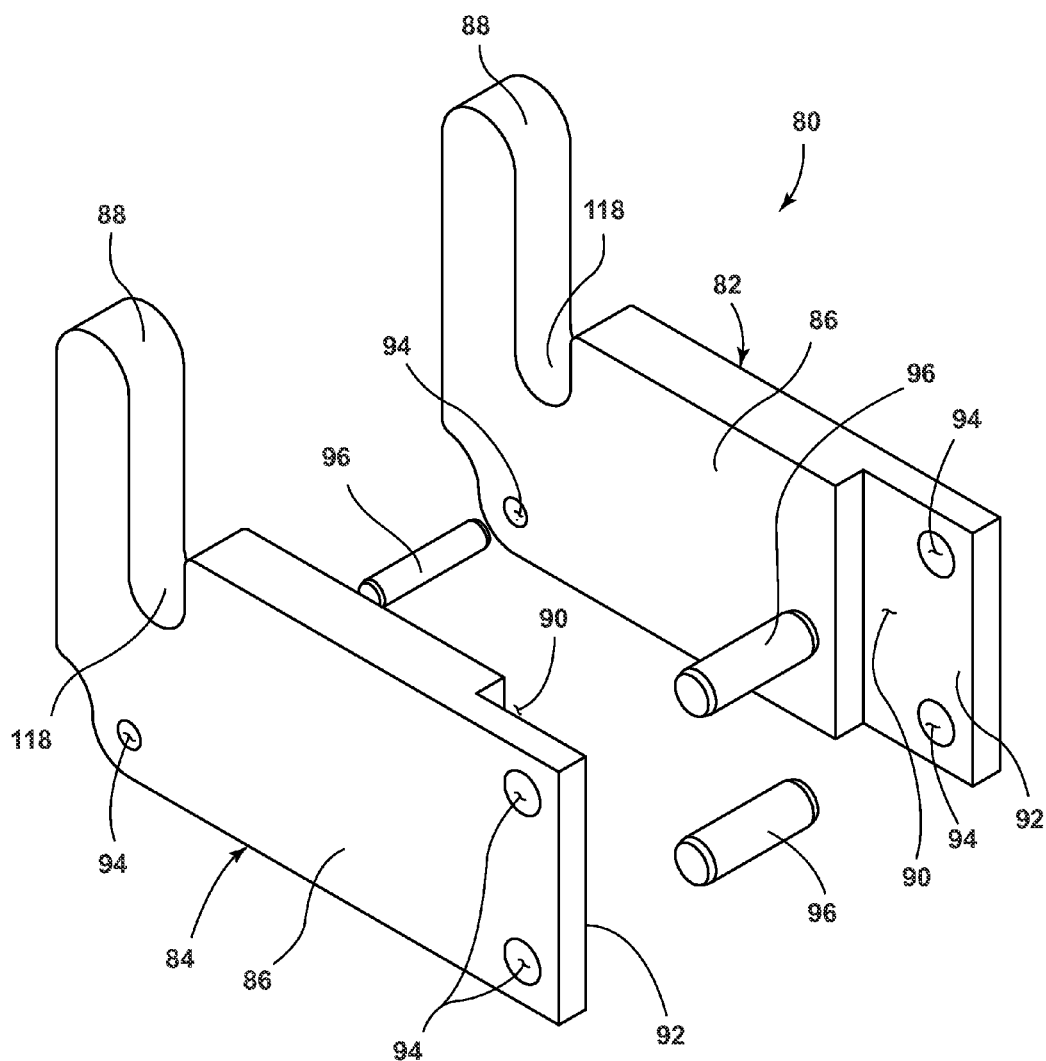
FIG. 5 is an exploded view of the hook assembly illustrated in FIG. 4.

Referring also to FIG. 5, the hook assembly 80 may comprise a generally rectangular first side plate 82 and a generally rectangular second side plate 84, having a combined width of 1½-inch for changeover part components having a deck spacing of 1½-inch. The first and second side plates 82, 84 may be mirror images of each other. Each side plate 82, 84 may have a midsection 86 transitioning through a distal cradle 118 into a hook-like finger 88 and a pin aperture 94 at one end of the side plate 82, 84. An opposed end of the side plate 82, 84 may be characterized by a rabbet 90 forming an offset flange 92 and having a pair of pin apertures 94 therethrough.

The side plates 82, 84 may be aligned and joined together to define a single finger 88 and a single midsection 86 defining a distal cradle 118, terminating in parallel spaced offset flanges 92. The rabbets 90 may be configured so that the separation distance of the flanges 92 may be somewhat greater than the thickness of the upright support 50. The side plates 82, 84 may be joined together by pins 96 inserted through the pin apertures 94. Alternatively, the side plates 82, 84 may be joined together by threaded fasteners, rivets, or other suitable fasteners. Adhesives may be selectively utilized along the adjoining surfaces of the side plates 82, 84.

The pins 96 may be configured so that the hook assembly 80 may be inserted through two adjoining L-shaped hanger openings 72 for locking engagement with the upright supports 50.

Figure 6:
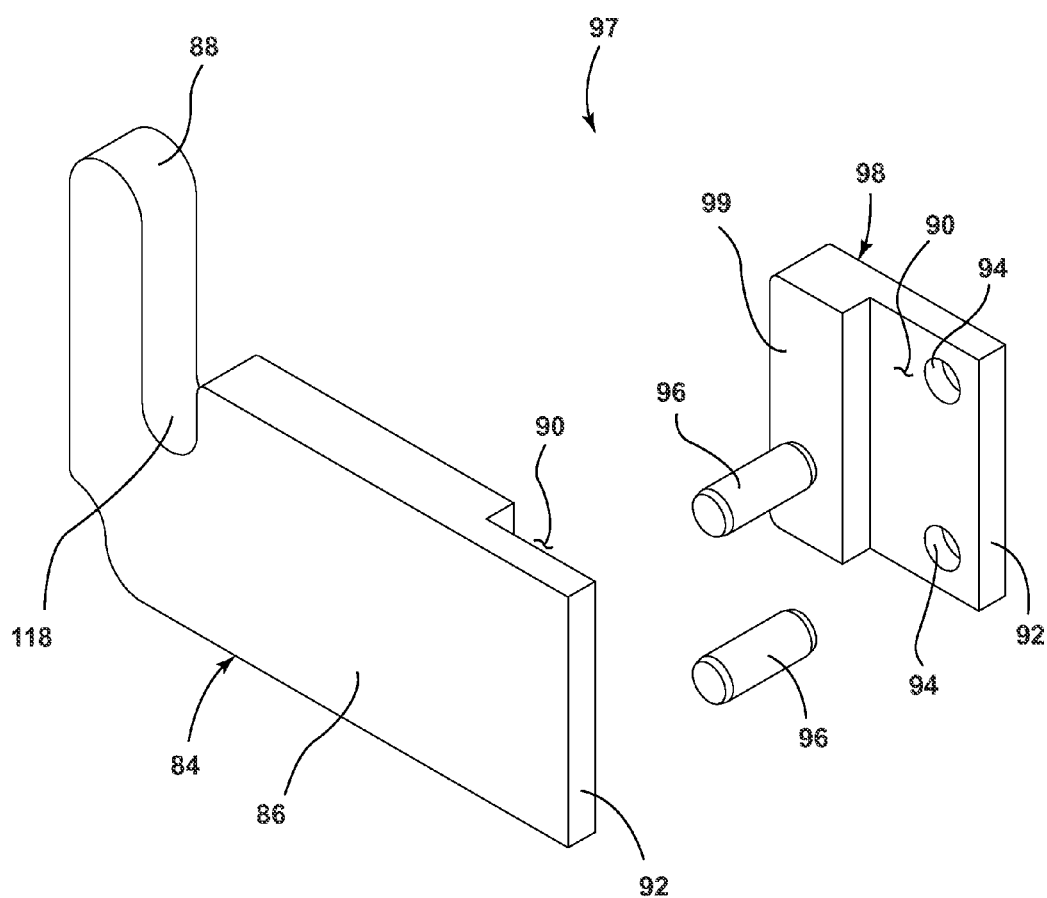
FIG. 6 is an exploded view of an alternative hook assembly for suspension from the upright support.

FIG. 6 illustrates an alternative embodiment single hook assembly 97 that may mount changeover parts having a deck spacing of ¾-inch to 1½-inch. These changeover parts may be too thin for mounting on the 1½-inch wide hook assembly 80. The single hook assembly 97 may comprise the second side plate 84 of the hook assembly 80, with a coupler block 98 substituted for the first side plate 82. The coupler block 98 may be a rectangular body comprising an abbreviated side plate 99 transitioning to the offset flange 92. The offset flange 92 of the coupler block 98 may be a mirror image of the offset flange 92 of the second side plate 84, having the pair of pin apertures 94 for receipt of the pins 96.

The abbreviated side plate 99 may have a thickness generally equal to the thickness of the midsection 86. The rabbets 90 may be configured so that the separation distance of the flanges 92 may be somewhat greater than the thickness of the upright support 50. The coupler block 98 may be joined to the second side plate 84 generally as described hereinbefore.

The single hook assembly 97 may be characterized by a hook 88, a distal cradle 118, and a midsection 86 that may have a thickness one-half the thickness of the hook assembly 80, i.e. ¾-inch. Because the joined second side plate 84 and coupler block 98 may have the same rabbet 90, offset flange 92, and pin 96 configuration as the hook assembly 80, the single hook assembly 97 may be coupleable with the hanger assemblies 42 in the same manner as the hook assembly 80. The reduced width of the hook 88 may enable changeover parts 40 having a width of ¾-inch to 1½-inch to be suspended from the modular changeover parts cart 10 by a simple substitution of hook assemblies, without modification of the cart or the hanger assemblies.

Figure 7:
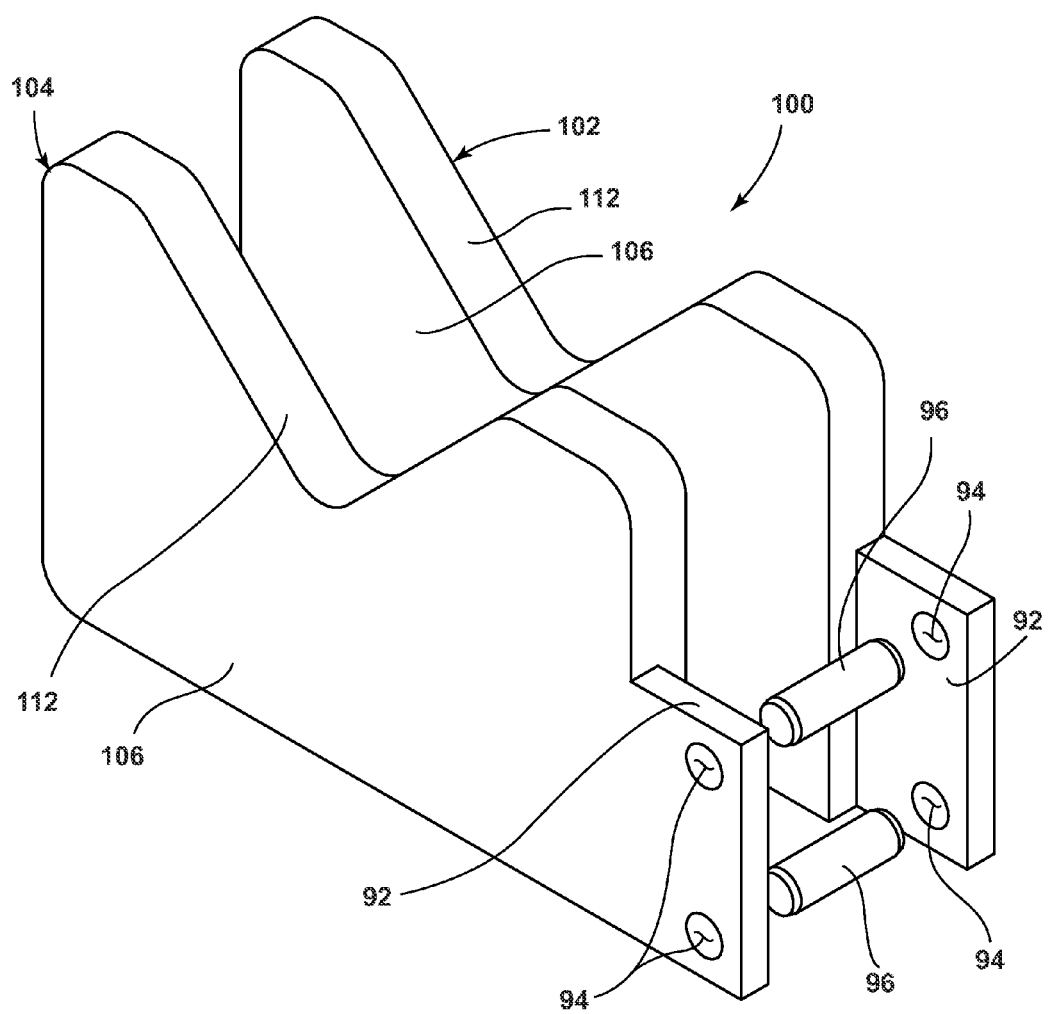
FIG. 7 is an exploded view of a timing screw support assembly for suspension from the upright support.

Turning now to FIG. 7, a timing screw support assembly 100 may share several features of the hook assembly 80. The timing screw support assembly 100 may comprise a generally rectangular first side plate 102 and a generally rectangular mirror image second side plate 104, each having a midsection 106 transitioning to an offset flange 92. Each offset flange 92 may be provided with a pair of pin apertures 94 for receipt of pins 96 in a manner similar to the hook assembly 80.

The midsection 106 may be configured with a vee-notch 112. In a manner similar to the hook assembly 80, the side plates 102, 104 may be joined together using fastening devices such as pins 96, adhesives, threaded connectors, rivets, and the like to form a single timing screw support assembly 100.

When so assembled, the timing screw support assembly 100 may be coupled with the upright support 50 in a manner similar to the hook assembly 80. Referring again to FIGS. 2 and 3, timing screw support assemblies 100 may be attached to upright supports 50 for supporting a plurality of timing screws 48.

Figure 8:
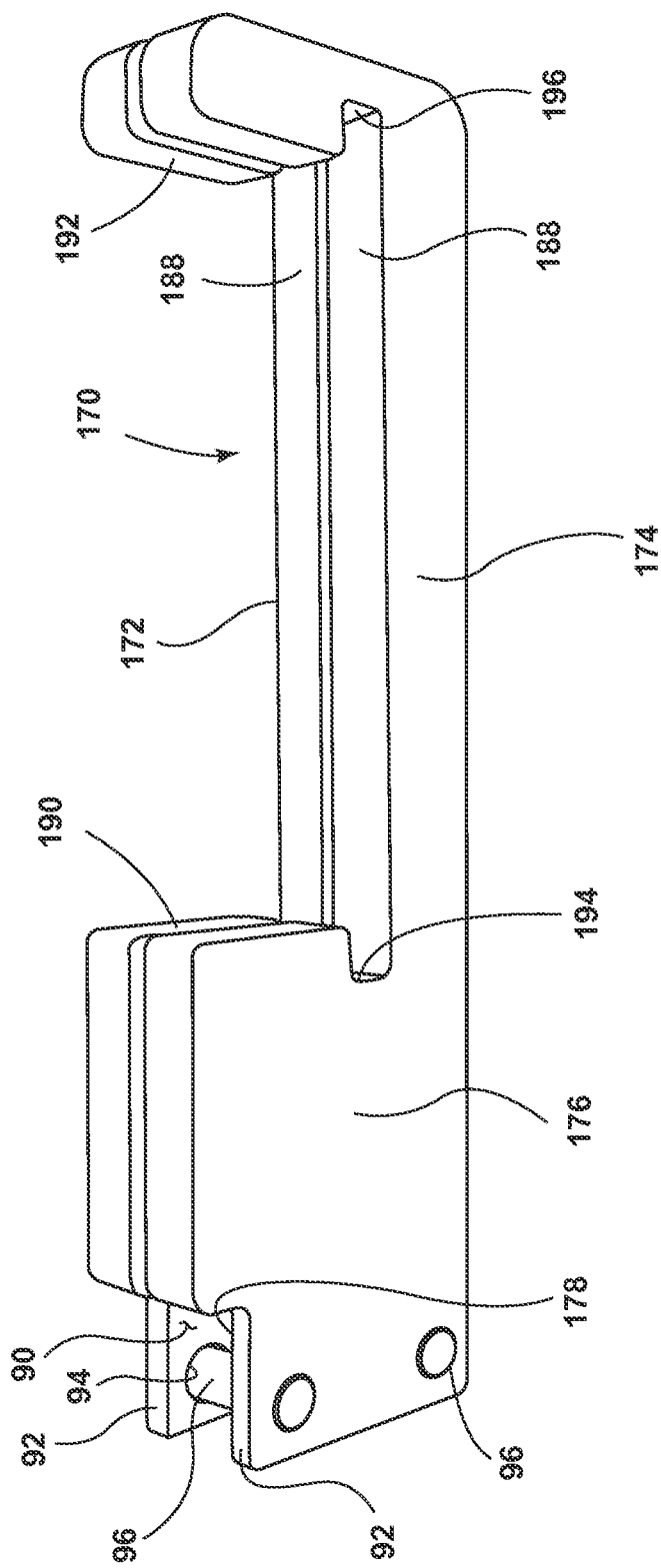
FIG. 8 is a perspective view of an upright mounted support hook assembly for suspension from the upright support.

FIG. 8 illustrates an embodiment of a support hook for supporting a box or a shelf. An upright support-mounted support hook 170 may share several features of the hook assembly 80 and single hook assembly 97. The support hook 170 may be a generally rectangular element comprising a first side plate 172 and a second side plate 174. Each side plate 172, 174 may include a midsection 176 transitioning into an offset flange 92 defined by a rabbet 90. The offset flanges 92 may each have a pair of openings 94 for receipt of pins 96 therethrough.

The side plates 172, 174 may be joined with one another to form the support hook 170, which may be coupled with the upright support 50 as hereinbefore described. Each side plate 172, 174 may include an opening defined by a bottom edge 188 and orthogonal side edges 190, 192. The corner of the first side edge 190 and the bottom edge 188 may define a first notch 194, and the corner of the second side edge 192 and the bottom edge 188 may define a second notch 196.

The upright support-mounted support hook 170 may be coupled with the upright support 50 in a manner similar to the hook assembly 80 and single hook assembly 97. A pair of spaced support hooks 170 may support a shelf (not shown) by sliding the shelf along the bottom edges 188 through the notches 194 196, which may couple the shelf with the support hooks 170.

Figure 9:
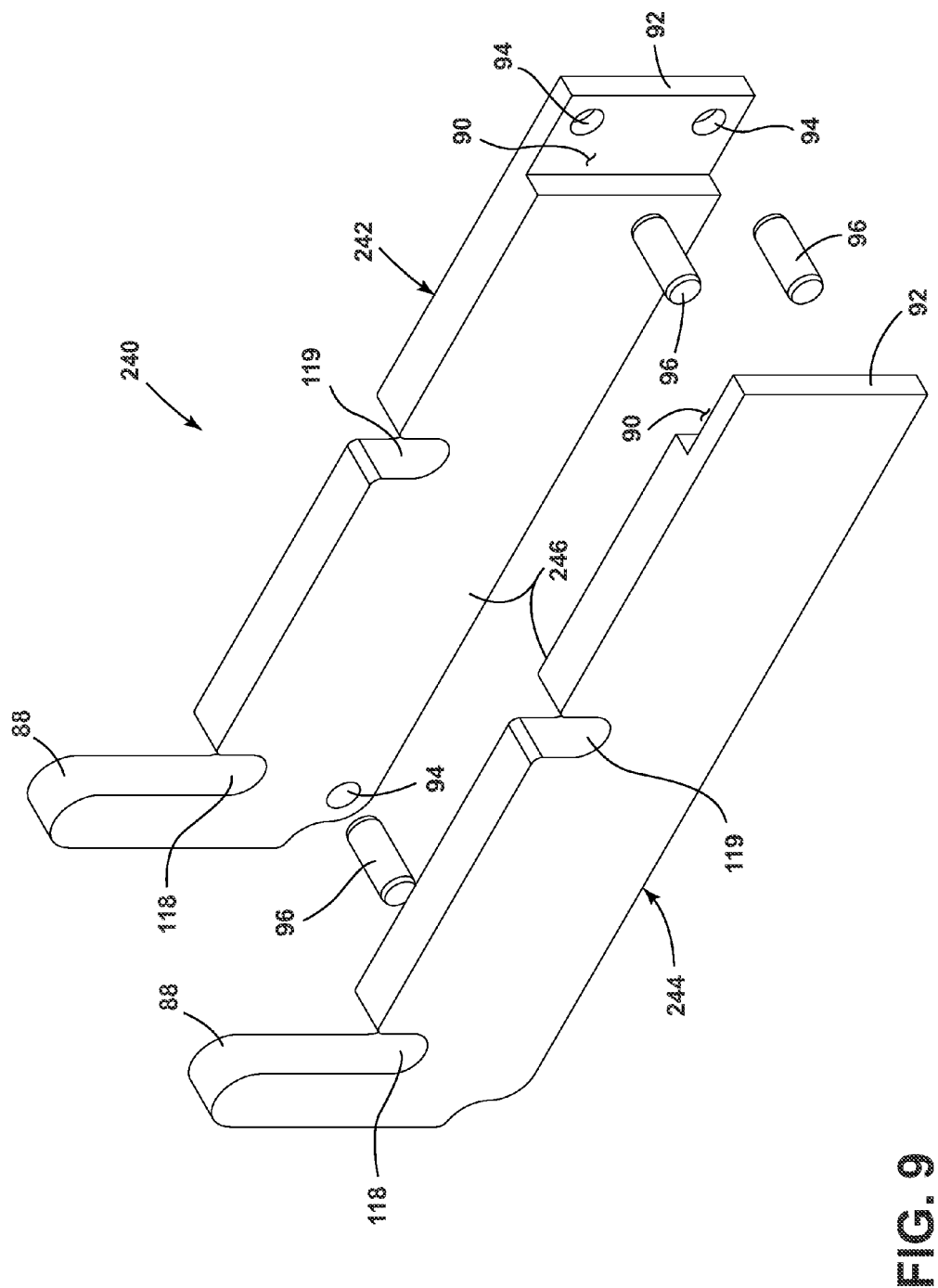
FIG. 9 is a perspective view of an upright mounted double hook assembly for suspension from the upright support.

Referring to FIG. 9, a double hook assembly 240 may share several features of the hook assembly 80. The only significant difference between the two may be in the length of the double hook assembly 240, which may be greater than the length of the hook assembly 80. The double hook assembly 240 may comprise a generally rectangular first side plate 242 and a generally rectangular second side plate 244. The first and second side plates 242, 244 may be mirror images of each other.

Each side plate 242, 244 may be characterized at one end by a rabbet 90 forming an offset flange 92 and having a pair of pin apertures 94 therethrough, and at an opposed end by a distal cradle 118, a hook-like finger 88, and a pin aperture 94. Each side plate 242, 244 may be characterized by a midsection 246 extending from the offset flanges 92 to the distal cradle 118. The midsection may be characterized by a proximal cradle 119 having a profile similar to the profile of the distal cradle 118. The cradles 118, 119 may provide a means of suspending a pair of changeover parts from a single hook assembly, or suspending a single changeover part from both cradles 118, 119.

Figure 10:
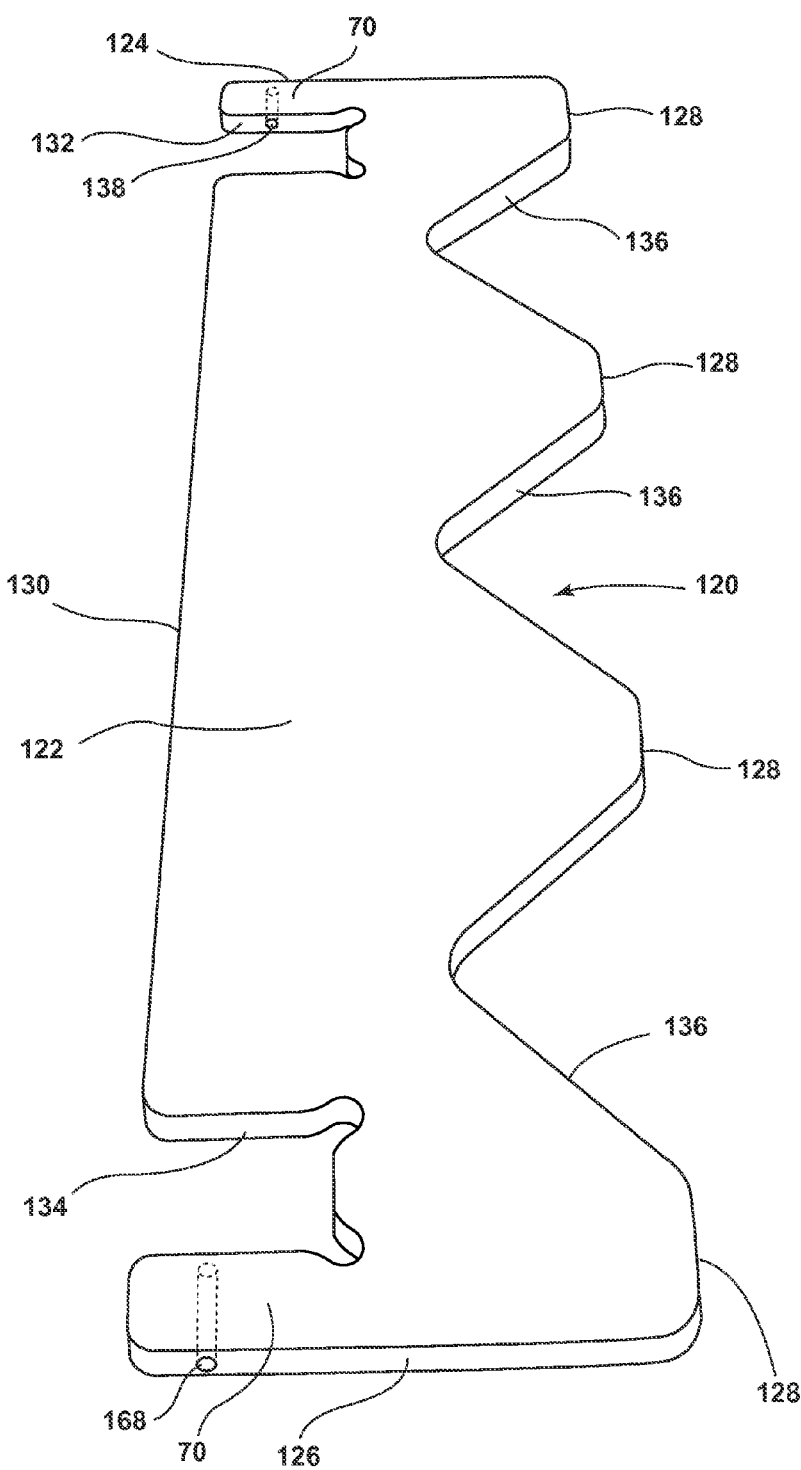
FIG. 10 is a perspective view of a beam-mounted multiple timing screw support.

FIG. 10 illustrates a multiple timing screw support 120 adapted for bridging between an adjacent pair of horizontally parallel beams. The timing screw support 120 may comprise a generally rectangular midsection 122 having a distal end 124 and a parallel spaced proximal end 126. A first side edge 128 and a parallel spaced second side edge 130 may extend between the ends 124, 126. A pair of generally rectangular beam openings 132, 134 may extend inwardly from the second side edge 130, spaced somewhat from the ends 124, 126, respectively, to define a distal end and a proximal end tongue 70, respectively. The beam openings 132, 134 may be configured for slidable supported engagement with a pair of beams. Along the first side edge 128, a plurality of vee-notches 136 may define a support for a plurality of timing screws 48. Referring again to FIG. 2, a plurality of multiple timing screw supports 120 are illustrated extending between pairs of parallel spaced beams.

A distal lock screw aperture 138 may extend through the distal end tongue, and a proximal lock screw aperture 168 may extend through the proximal end tongue. Each aperture 138, 168 may be threaded to receive a setscrew (not shown) for locking the multiple timing screw support 120 to a pair of beams.

Figure 11:
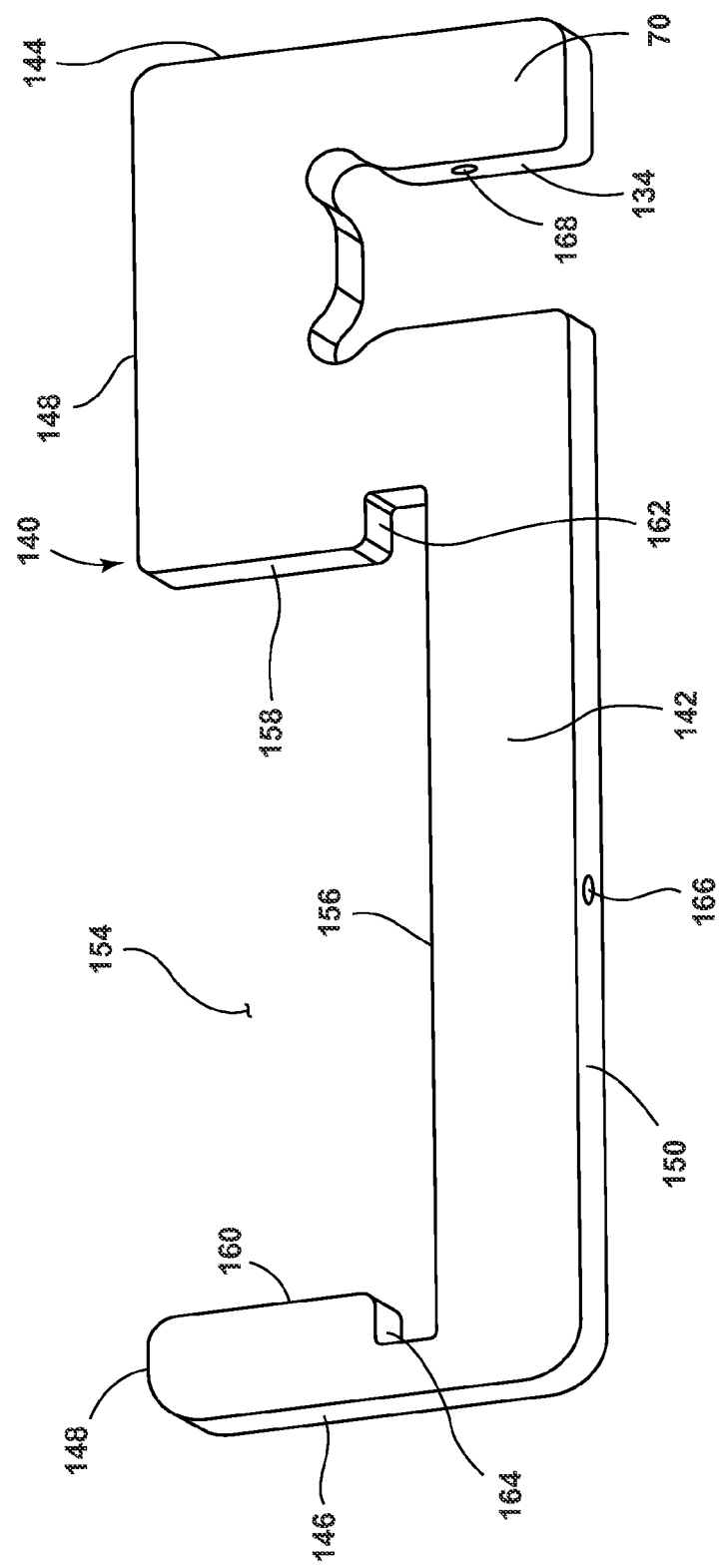
FIG. 11 is a perspective view of a beam-mounted support hook assembly.

Referring now to FIG. 11, a beam-mounted support hook 140 may be a generally rectangular element characterized by a first end 144 and a spaced parallel second end 146, separated by a midsection 142. A first side edge 148 and a parallel spaced second side edge 150 may extend between the ends 144, 146. A generally rectangular proximal beam opening 134 may extend inwardly from the second side edge 150. The beam opening 134 may be separated from the first end 144 by a tongue 70.

A generally rectangular support unit opening 154 may extend inwardly from the first side edge 148, defined by a bottom edge 156 parallel with the first side edge 148, and a pair of parallel spaced side edges 158, 160 extending orthogonally away from the bottom edge 156. The corner of the bottom edge 156 and first side edge 158 may define a first rectangular notch 162. The corner of the bottom edge 156 and second side edge 160 may define a second rectangular notch 164.

A pair of spaced beam-mounted support hooks 140 may support a shelf (not shown) by sliding the shelf along the bottom edges 156 through the notches 162, 164, which may couple the shelf with the support hooks 140.

A proximal lock screw aperture 168 may extend through the tongue 70 into the beam opening 134. A second aperture 166 may extend through the second side edge 150 into the support unit opening 154. Each aperture 166, 168 may be threaded to receive a setscrew (not shown) for locking the beam-mounted support hook 140 to a beam, and locking a shelf to the beam-mounted support hook 140.

Figure 12:
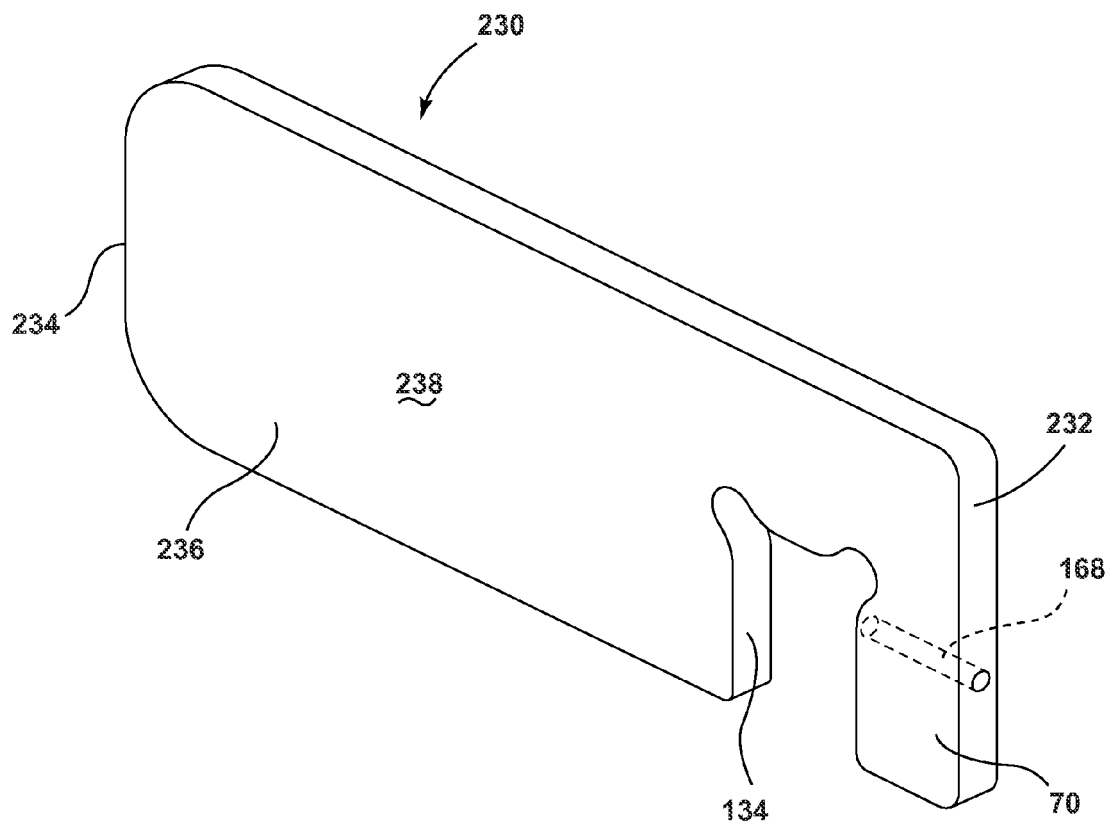
FIG. 12 is a perspective view of a beam-mounted changeover part stabilizer for stabilizing a changeover part carried on the modular changeover parts cart of FIG. 2.

Referring now to FIG. 12, a changeover part stabilizer 230 comprises a generally rectangular planar platelike support paddle 236 characterized by a proximal end 232 and an opposed distal end 234. A proximal beam opening 134 may extend through the support paddle 236, spaced somewhat from the proximal end 232, to define a tongue 70 and a paddle surface 238. The tongue 70 may be penetrated by a threaded proximal lock screw aperture 168. The changeover part stabilizer 230 may be selectively coupled with a beam 20, 22, 24, 28, 30, 32, 34, 36, 38 by slidably dropping the proximal beam opening 134 over a selected beam. A setscrew (not shown)

may be installed in the screw aperture 168 against the beam to fix the changeover part stabilizer 230 to the beam.

A single changeover part stabilizer 230 may be attached to a beam so that the support paddle 236 may be adjacent or in contact with a suspended changeover part 40. Alternatively, a pair of changeover part stabilizers 230 may be attached to a beam separated by a distance approximately equivalent to the deck spacing of a suspended changeover part 40. The changeover part stabilizers 230 may be positioned along a beam to bracket a portion of the suspended changeover part 40, and thereby prevent pendular motion of the suspended changeover part 40 leading to potentially damaging contact with adjacent suspended changeover parts. It may be anticipated that changeover part stabilizers 230 may be utilized for relatively large single deck changeover parts that may be supported by a single deck frame mounted assembly 250 illustrated in FIG. 13.

Figure 13:
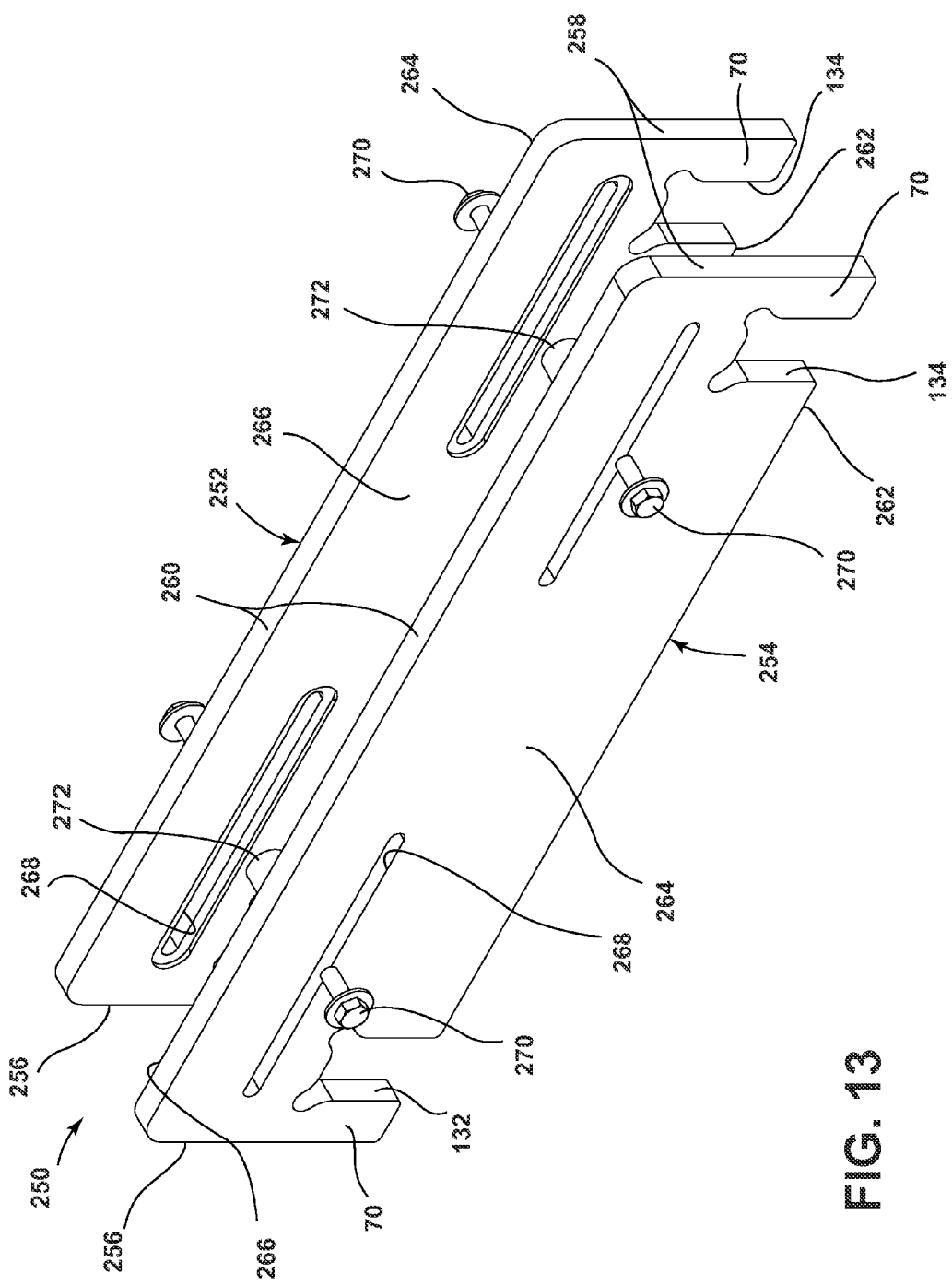
FIG. 13 is an exploded view of a beam-mounted single deck frame mount assembly for mounting a single deck changeover part.

As illustrated in FIG. 13, a single deck frame mount assembly 250 may comprise a first side plate 252 and a second side plate 254 in parallel spaced disposition. The side plates 252, 254 may be identical, each comprising a flat platelike body having a generally uniform thickness, and a generally elongate rectangular profile. Each side plate may be characterized by a distal end 256 and an opposed proximal end 258 connected by an upper side edge 260 and a parallel spaced lower side edge 262, and by an obverse surface 264 and a reverse surface 266.

A distal beam opening 132 may extend through each side plate 252, 254, spaced somewhat from the distal end 256 to define a tongue 70, and a proximal beam opening 134 may extend through each side plate 252, 254, spaced somewhat from the proximal end 258 to define a tongue 70. Each side plate 252, 254 may comprise a pair of narrow elongate shouldered slots 268 extending through a side plate 252, 254 parallel with the upper side edge 260.

Each shouldered slot 268 may lie at least partially between a beam opening 132, 134 and an upper side edge 260, and may extend a selected distance toward the center of a side plate. The pair of shouldered slots in each side plate 252, 254 may be aligned longitudinally end-to-end in spaced orientation. Each shouldered slot 268 may be configured with a first width along the obverse surface 264, and a second width greater than the first width along the reverse surface 266. Thus, a shoulder may be defined by the transition of the first relatively narrow slot to the second relatively wide slot. The shoulder may be accessible from the reverse surface 266.

The single deck frame mount assembly 250 may comprise a pair of fastener assemblies 270, which may comprise, for example, a threaded bolt and nut, and a pair of tubular spacers 272. The width of the shouldered slot 268, the diameter of the fastener assembly 270, and the inside diameter of the tubular spacer 272, may be selected so that the faster assembly 270 may be slidably received within the tubular spacer 272, and the ends of each tubular spacer 272 may be seated in a shouldered slot 268 in each of a pair of facing side plates 252, 254. Each pair of facing shouldered slots 268 may receive a fastener assembly 270 and tubular spacer 272 for spaced alignment of the side plates 252, 254. The length of each spacer 272 may be selected so that the side plates 252, 254 may be separated by a distance approximately equivalent to the deck spacing of a suspended changeover part.

The assembled single deck frame mount assembly 250 may be attached to a pair of parallel spaced beams by engaging the beams in the beam openings 132, 134 so that the assembly may be oriented horizontally. Changeover parts may then be slidably received within the space between the side plates 252, 254.

The single deck frame mount assembly 250 may accommodate changeover parts having only a single deck. Single deck changeover parts do not lend themselves to hook assemblies such as the hook assembly 80, the single hook assembly 97, the double hook assembly 240, and the like. The single deck frame mount assembly 250 may be utilized to hold, for example, a single deck starwheel or a single deck center guide. The single deck changeover part may be inserted between the facing side plates 252, 254 to rest on the tubular spacers 272.

Figure 14:
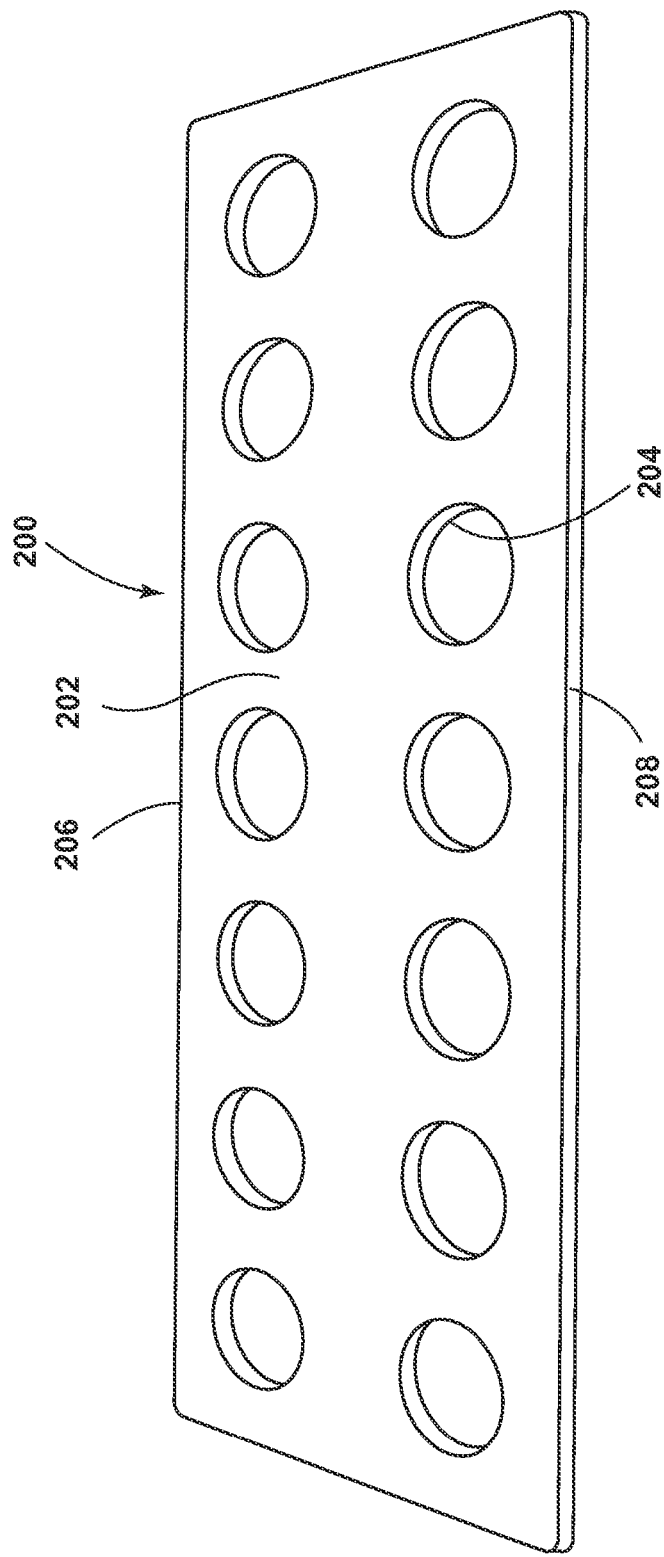
FIG. 14 is a perspective view of a shelf for use with either the upright mounted support hook assembly of FIG. 8 or the beam-mounted support hook assembly of FIG. 11.

FIG. 14 illustrates a generally rectangular plate-like shelf 200 having an obverse surface 202 and an opposed, parallel reverse surface 204. The shelf 200 may define a first longitudinal edge 206 and a parallel spaced second longitudinal edge 208. The shelf 200 may be provided with an array of openings extending from the obverse surface 202 to the reverse surface 204 for support of changeover parts. Alternatively, the shelf may be solid, without any openings.

Figure 15:
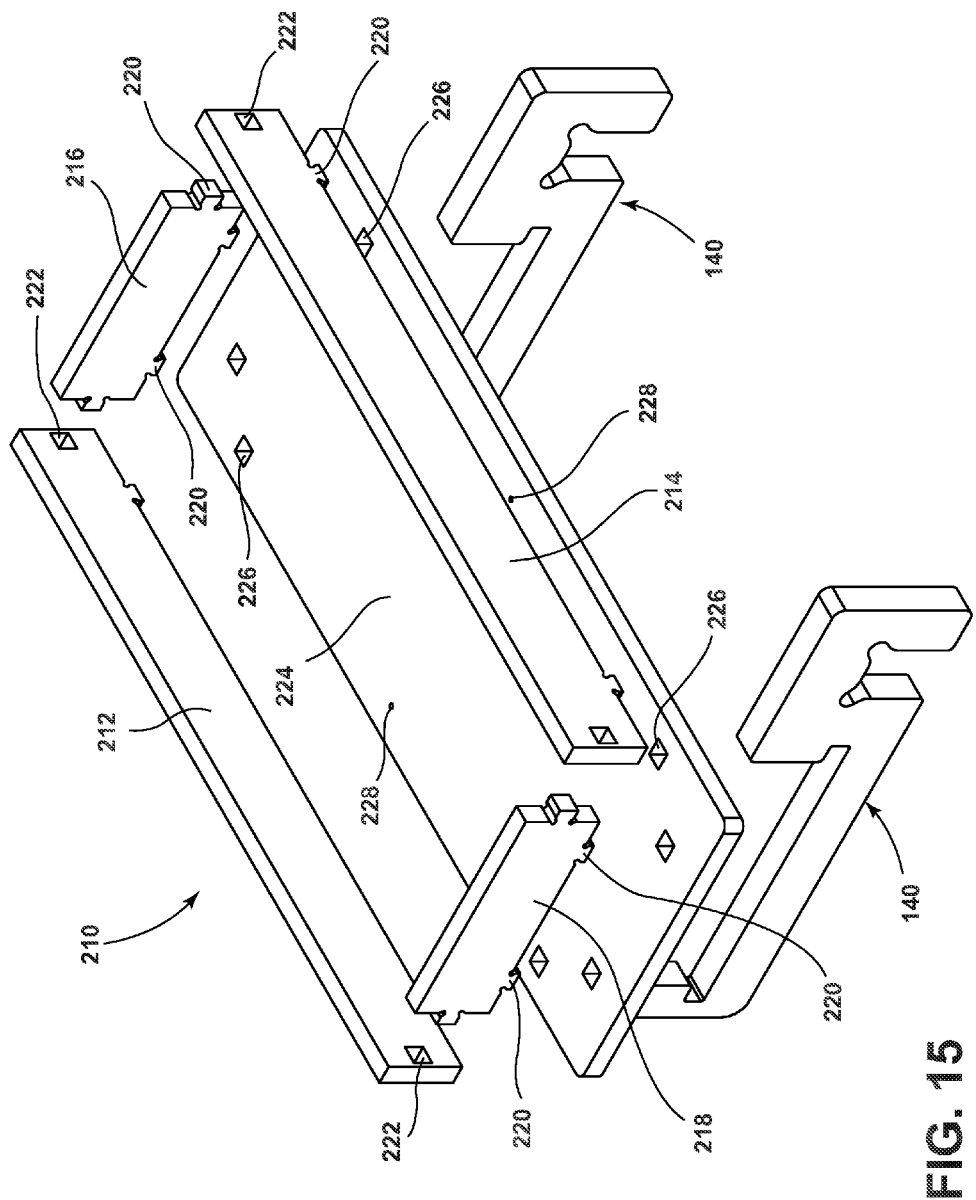
FIG. 15 is an exploded view of a box adapted for support by a pair of beam-mounted support hook assemblies illustrated in FIG. 11.

FIG. 15 illustrates a box 210 having a first sidewall 212 and a parallel spaced second sidewall 214. A first end wall 216 and a parallel spaced second end wall 218 may extend between the side walls 212, 214 to form an enclosure. The enclosure may be adapted for joining with a bottom wall 224 to form the box 210. The bottom wall 224, side walls 212, 214, and end walls 216, 218 may be finished with tenons 220 and mortises 222, 226 for rigidly joining the walls 212, 214, 216, 218 to one another and the enclosure to the bottom wall 224.

The bottom wall 224 may also be provided with an aperture 228 aligned with the side walls 212, 214 for insertion of a fastener through the aperture 228 into the side walls 212, 214 to retain the enclosure to the bottom wall 224.

As also illustrated in FIG. 15, the bottom wall 224 may be coupled with beam-mounted support hooks 140 by slidably engaging the bottom wall 224 with the notches 162, 164 to rest upon the bottom edges 156. Threaded fasteners may be inserted through the openings 166 into the bottom wall 224 to retain the box 210 in a selected position on the beam-mounted support hooks 140. Similarly, the shelf 200 may be coupled with a pair of beam-mounted support hooks 140 in a similar manner.

Alternatively, a pair of upright mounted support hooks 170 may be coupled with a pair of upright supports 50 as previously described for supporting a shelf 200 or a box 210 by slidably engaging the bottom wall 224 or the shelf 200 with the notches 194, 196 to rest upon the bottom edges 156, 188.

It may be noted that several of the hanger assemblies described and illustrated herein include threaded lock screw apertures and lock screws for locking a mounting component to a beam, while other described and illustrated hanger assemblies do not. The presence or absence of such an aperture and/or lock screw should not be taken as an indication that such feature is or is not to be included in the pertinent mounting component.

The modular changeover parts cart 10 may be fully adjustable and expandable. This cart has been designed to hold changeover parts that may be unique to the packaging industry. It may be configured for as few as a single set of parts, and expanded to accommodate additional sets of changeover parts as they may be needed on a specific packaging line.

Prior art carts may be generally configured to carry a single set of changeover parts, which may be aligned along the longitudinal vertical plane of the cart, and parallel with the cart sides that support the changeover parts. The modular changeover parts cart, however, may enable the hanger assemblies to be attached to the cart frame so that changeover parts may be suspended in an orientation perpendicular to the longitudinal vertical plane of the cart. This may enable more sets of changeover parts to be carried on a single cart. Furthermore, the area occupied by a parts set may be less limiting since the parts may be suspended in order that the greater portion of the parts extend outwardly away from the center of the cart.

This change in orientation from the prior art may enable multiple sets of parts to be stored on a single cart. The modular hanger assemblies may be exchanged and/or adjusted to accept various sized parts without custom designing each cart. A single cart may do the job of many different carts. The hanger assemblies may be adjusted horizontally along the frame to increase or decrease spacing between parts. The multiple attachment locations of the hooks may enable the storage of a range of changeover part sizes for a range of packages or machines. Special support assemblies coupled with the upright supports may be provided for timing screws. Other support assemblies may be mounted on the cart frame for screws of varying length and diameter. Storage boxes and shelves may be supported with two support hooks. These may accommodate additional parts such as capping chucks, filling nozzles, centering bells, etc.

Multiple sets of parts may be stored on both sides of the modular changeover parts cart, exceeding the number that may be carried on the conventional styles of cart. A single style of mounting component may be readily adapted to accommodate any size and type of changeover part. The basic configuration of the cart, i.e. the frame, may remain the same. What changes may be the configuration of hanger assemblies. Thus, a changeover part may be hung on any cart, and a cart may carry any changeover part.

While the invention has been specifically described in connection with certain specific embodiments thereof, it may be to be understood that this may be by way of illustration and not of limitation. Reasonable variation and modification may be possible within the scope of the forgoing disclosure and drawings without departing from the spirit of the invention which may be defined in the appended claims.

What may be claimed may be:

1. A modular changeover parts cart for changeover parts comprising star wheels, guides, and timing screws, the modular changeover parts cart comprising:
    a cart frame supportable on wheels comprising a plurality of rigidly interconnected beams;
    a suspension frame supportable on the cart frame comprising a plurality of rigidly interconnected vertical struts and beams; and
    a first one of a plurality of mounting components removably coupleable with the cart frame or the suspension frame for supporting one of the star wheels, the guides, or the timing screws;
    wherein the first one of the plurality of mounting components is simultaneously orthogonally coupleable with the beams of the suspension frame; and
    wherein the first one of the plurality of mounting components is replaceable by or combinable with a second one of the plurality of mounting components for supporting another one of the star wheels, the guides, or the timing screws; and
    wherein the first one of the plurality of mounting components comprises an elongate upright support characterized by a first edge with an L-shaped beam opening, and a parallel second edge with a plurality of inverted L-shaped hanger openings.

2. A modular changeover parts cart according to claim 1 wherein the first one and second one of the plurality of mounting components supports a plurality of the star wheels, the guides, or the timing screws perpendicular to at least one of the beams of the suspension frame or the cart frame.

3. A modular changeover parts cart according to claim 2 wherein the cart frame defines an area with selected dimensions.

4. A modular changeover parts cart according to claim 3 wherein the plurality of the star wheels, the guides, or the timing screws are supportable within the area defined by the cart frame.

5. A modular changeover parts cart according to claim 3 wherein a plurality of the star wheels is supportable from the beams of the suspension frame, a plurality of the guides is supportable from the beams of the suspension frame, and a plurality of the timing screws is supportable from the beams of the cart frame or the suspension frame.

6. A modular changeover parts cart according to claim 5 wherein the plurality of the star wheels, the guides, or the timing screws are supportable within the area defined by the cart frame.

7. A modular changeover parts cart according to claim 1 wherein the plurality of the star wheels, the guides, and the timing screws are supportable from a single one of the beams of the suspension frame.

8. A modular changeover parts cart according to claim 1 wherein the plurality of the star wheels, the guides, and the timing screws are supportable on both sides of a single one of the beams of the suspension frame.

9. A modular changeover parts cart according to claim 1 wherein the first one of the plurality of mounting components is attachable to a cantilevered beam of the suspension frame.

10. A modular changeover parts cart according to claim 9 wherein the first one of the plurality of mounting components includes one of a multiple timing screw support, a beam mounted support hook, a changeover part stabilizer, and a single deck frame mount assembly.

11. A modular changeover parts cart according to claim 1 wherein the modular changeover parts cart is movable to one of a plurality of work stations, and one of the changeover parts for use at the work station is accessible from the modular changeover parts cart at the work station.

12. A modular changeover parts cart for changeover parts comprising star wheels, guides, and timing screws utilized during a selected production run, the modular changeover parts cart comprising:
    a first assembly of cart frame beams supportable on wheels;
    a second assembly of suspension frame beams and an assembly of vertical struts, supportable on the first assembly of cart frame beams;
    a first mounting component coupleable and uncoupleable with a first one of the cart frame beams or the suspension frame beams;
    a second mounting component coupleable and uncoupleable with either the first one of the cart frame beams or the suspension frame beams, a second one of the cart frame beams or the suspension frame beams, or the first mounting component; and
    a plurality of star wheels, guides, and timing screws which are coupleable and uncoupleable with either or both of the first mounting component and the second mounting component;
    wherein coupling and uncoupling of the first mounting components and the second mounting components with and from the cart frame beams or the suspension frame beams is by slidable engagement without the use of tools.

13. A modular changeover parts cart according to claim 12 wherein the first mounting component comprises an elongate upright support characterized by a first edge with an L-shaped beam opening, and a parallel second edge with a plurality of inverted L-shaped hanger openings.

14. A modular changeover parts cart according to claim 13 wherein the second mounting component is attachable to one of the plurality of inverted L-shaped hanger openings.

15. A modular changeover parts cart according to claim 14 wherein the second mounting component is one of a hook assembly, a single hook assembly, a timing screw mount, an upright mounted support hook, and a double hook assembly.

16. A modular changeover parts cart according to claim 14 wherein the second ones of the plurality of mounting components are attachable to the plurality of inverted L-shaped hanger openings.

\* \* \* \* \*